INVENTOR.
EDWARD L. GARDNER
BY
William R. Lane
ATTORNEY

Jan. 3, 1956 E. L. GARDNER 2,729,777

MAGNETIC AMPLIFIER CIRCUIT FOR MOTOR

Filed Nov. 12, 1954 3 Sheets-Sheet 2

INVENTOR.
EDWARD L. GARDNER
BY
William R. Lane
ATTORNEY

Jan. 3, 1956 E. L. GARDNER 2,729,777

MAGNETIC AMPLIFIER CIRCUIT FOR MOTOR

Filed Nov. 12, 1954 3 Sheets-Sheet 3

INVENTOR.
EDWARD L. GARDNER
BY
William R. Lane
ATTORNEY

United States Patent Office 2,729,777

Patented Jan. 3, 1956

2,729,777

MAGNETIC AMPLIFIER CIRCUIT FOR MOTOR

Edward L. Gardner, Downey, Calif., assignor to North American Aviation, Inc.

Application November 12, 1954, Serial No. 468,213

9 Claims. (Cl. 318—207)

This invention relates to a system employing a pair of magnetic amplifiers for the control of the amplitude and phase of an A.-C. voltage supplied to a common load. More particularly, it relates to a circuit arrangement which considerably reduces the interaction between magnetic amplifiers which mutually control the application of power to a common load.

One of the applications of magnetic amplifiers is to provide controlled amplitude, phase-reversible, A.-C. power to a two-terminal load. Magnetic amplifier circuits which accomplish this are well-known, but the solution is at the expense of low power gain, low relative power handling capacity, and slow response. The core of a magnetic amplifier saturates at a particular instant in the supply line cycle depending on the control signal presented to the magnetic amplifier. Under a certain control signal, a particular supply voltage-time integral is necessary to saturate the core each cycle and cause the magnetic amplifier to "fire" much the same as a thyratron. Due to their construction, magnetic amplifiers are also sensitive to voltages impressed on their output circuit. That is, the core, in absorbing a particular voltage for a given time, does not distinguish whether or not the voltage is received from the supply source or is reflected from the alternate magnetic amplifier. If the magnetic amplifiers are not decoupled, each may cause the other to "fire" at an incorrect time in the supply line cycle. It is apparent, then, that magnetic amplifiers, which act as control gates between the power supply line and a given load, must be connected to the load in such a way that each amplifier does not interact with the other. Such interaction will cause large circulating currents within the system and loss of power and inaccurate control, all of which are undesirable. In some instances, oscillations would arise between the magnetic amplifiers.

In accordance with the present invention, a pair of magnetic amplifiers and a three-winding transformer are utilized in a circuit to provide power which is of controlled amplitude and phase-reversible in accordance with the control signals applied to the magnetic amplifiers. The output of this circuit may be used, for example, to drive electric motors at controlled speeds or in given directions, torquers, or more generally, any type of device requiring such control.

It is therefore an object of this invention to provide a magnetic amplifier loading system which decouples the magnetic amplifiers.

It is another object of this invention to provide a magnetic amplifier coupling circuit which is balanced.

It is still another object of this invention to provide a magnetic amplifier coupling circuit connected to provide amplitude-controlled, phase-reversible, A.-C. power to a load.

It is still another object of this invention to provide a magnetic amplifier coupling circuit having improved response time.

It is a further object of this invention to provide a magnetic amplifier coupling circuit having increased power handling ability.

Other objects of invention will become apparent from the following description taken in connection with the accompanying drawings, in which Fig. 1 is a schematic of the coupling circuit used to drive a two-phase motor;

Figure 4:
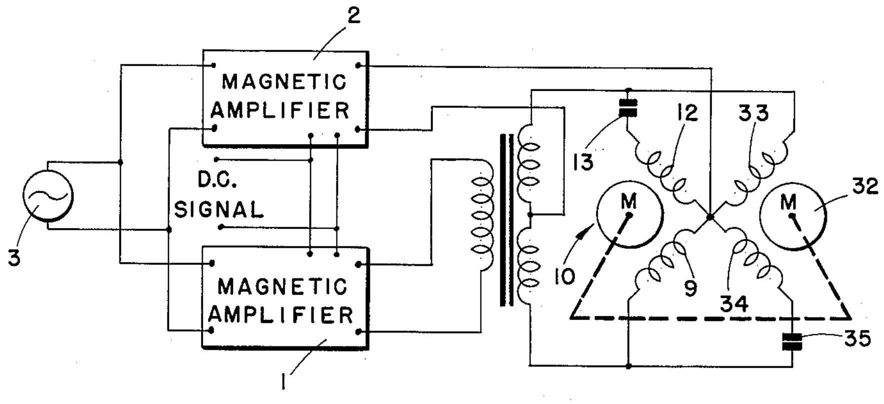

And Fig. 4 is a schematic indicating the connections for reversible dual motor operation.

Figure 1:
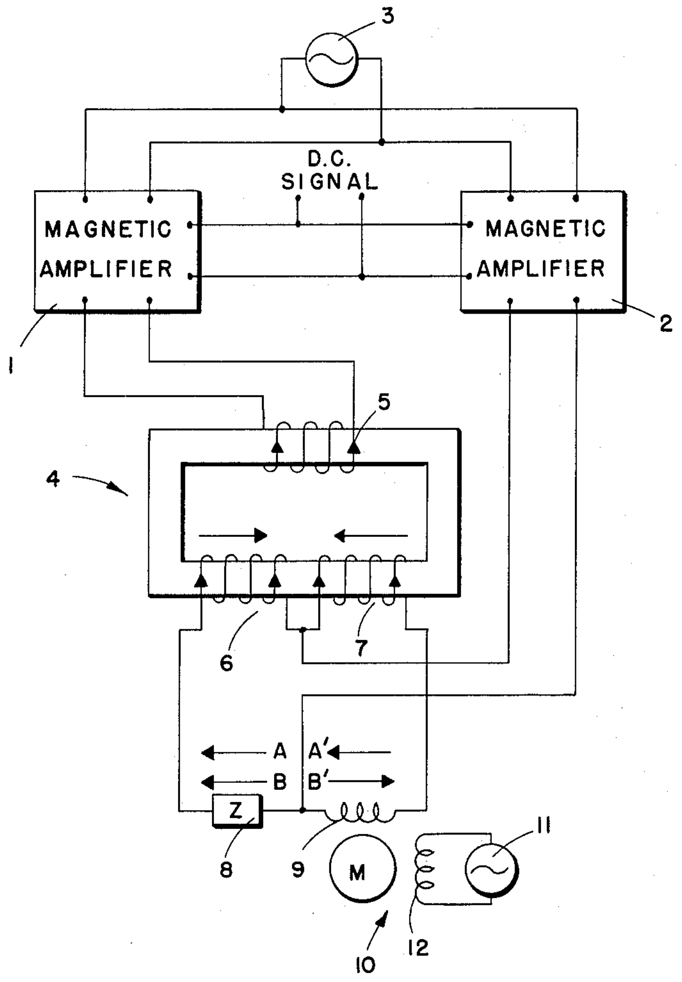

Referring now to Fig. 1, self-saturating magnetic amplifiers 1 and 2 are connected to receive power from a source 3. They are further connected to receive an input D.-C. signal which determines which amplifier provides power and the amount of power provided to the coupling circuit. Transformer 4 has three windings. Winding 5 is connected to receive the output of magnetic amplifier 1. Windings 6 and 7 are connected at their common point to one terminal of magnetic amplifier 2. Impedance 8 is connected to winding 6 and motor winding 9 is connected to winding 7 to provide parallel paths for the output of magnetic amplifier 2. Quadrature winding 12 of two-phase motor 10 receives a voltage from source 11 which is in quadrature relationship with source 3. Sources 3 and 11 together form a two-phase source. Impedance 8, in this instance, is a dummy load, the output current from transformer 4 dividing between the motor and the dummy load. Circuit balance is obtained when the dummy load matches the impedance presented by winding 9. This impedance depends, of course, upon the motor load.

In operation, assuming magnetic amplifier 1 is providing an output, voltage is transformed across transformer 4 from winding 5 to windings 6 and 7 and current is caused to flow in the load and dummy load. Magnetic amplifier 2, being connected to the center tap of the secondary of transformer 4, receives no voltage from the output of magnetic amplifier 1 and is uninfluenced by the flow of load current. In an alternate situation in which magnetic amplifier 2 is conducting, current is caused to flow in opposite directions in windings 6 and 7. Flux is generated by each of these windings in opposite directions as shown by the arrows. Therefore, winding 5 receives no net flux and the magnetic amplifier 1 is not influenced by the output of magnetic amplifier 2. As magnetic amplifier 1 controls, the load current flows in the direction indicated by arrows A and A′. As magnetic amplifier 2 controls, the load current flows in the direction indicated by arrows B and B′. It is noted that arrow B′ is reversed, providing motor reversal.

Figure 2:
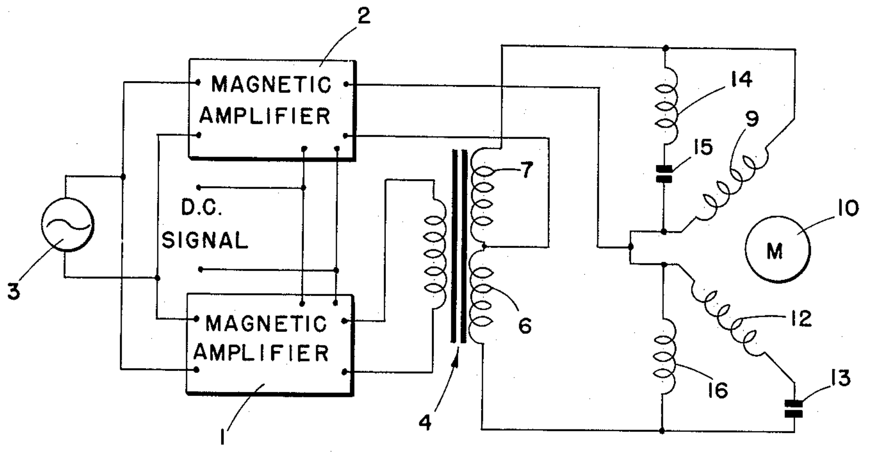
Fig. 2 is an alternate arrangement of the device of Fig. 1 in driving a two-phase motor.

Fig. 2 illustrates an alternate circuit connection in which the output of the circuit of the invention provides both phases to a two-phase motor. Windings 9 and 12 of two-phase motor 10 are connected to receive the output of windings 6 and 7 of transformer 4. Quadrature voltage is obtained across winding 12 by capacitor 13 connected in series therewith. The impedance matching of the motor is obtained by inductance 14 and capacitance 15, matched to inductance 12 and capacitance 13, and inductance 16 matched to inductance 9.

Figure 3:
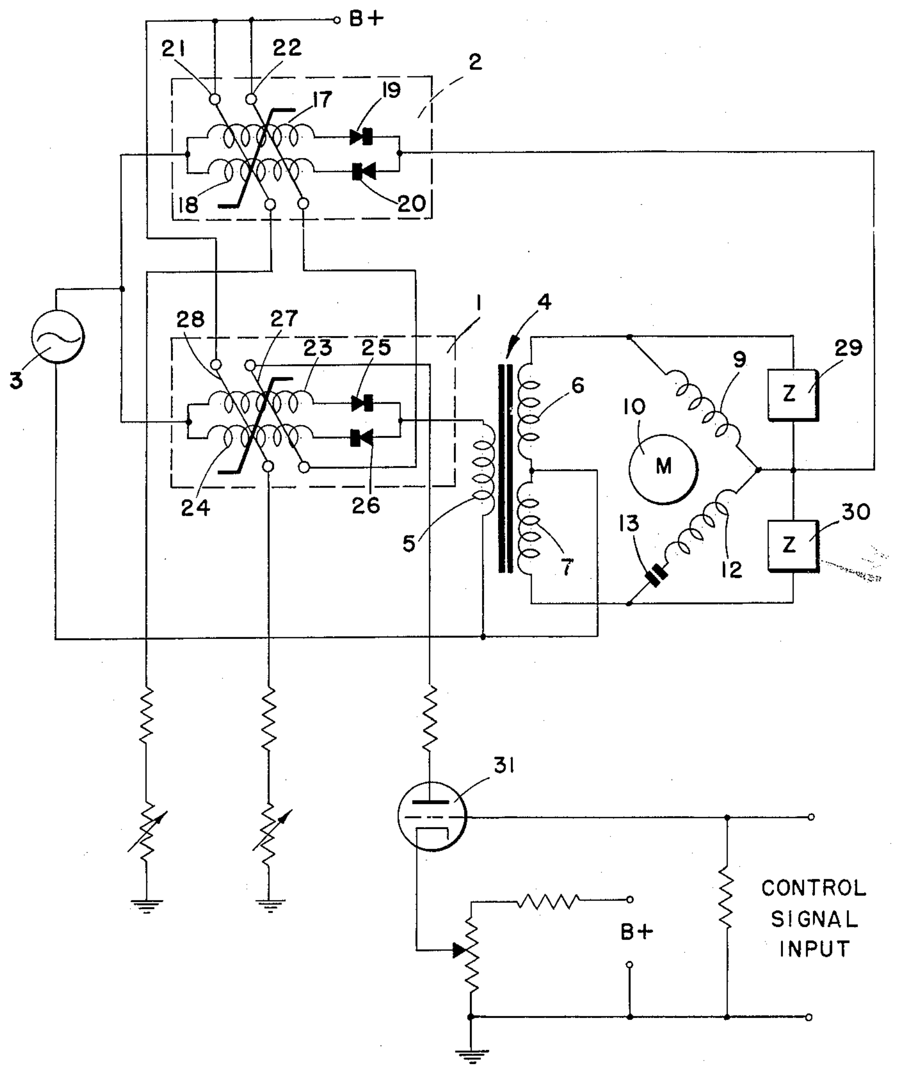
Fig. 3 is a second alternate arrangement of the device of Fig. 1 in driving a two-phase motor.

Fig. 3, which is a more detailed schematic of a magnetic amplifier, illustrates connection to transformer 4. Saturable reactors 17 and 18 together with diodes 19 and 20 and control windings 21 and 22 comprise magnetic amplifier 2. Saturable reactors 23 and 24 and diodes 25 and 26 and control windings 27 and 28 comprise magnetic amplifier 1. Amplifier 1 is connected to one side of control winding 5. A.-C. source 3 is connected to the other side of control winding 5 and then to the common connection of windings 6 and 7. Magnetic amplifier 2 is connected to the common connection of windings 9 and 12 of motor 10. Impedances 29 and 30 are adjusted to provide a matched and balanced load.

A D.-C. input signal is received by triode 31 which controls the current flow in control windings 27 and 22. The output of tube 31 determines which amplifier provides power to the load and how much power is provided.

The magnetization produced by current in control winding 22 aids the magnetization produced by bias current in winding 21 which is not large enough of itself to desaturate the magnetic amplifier 2 each power supply cycle. The current in control winding 27 bucks the bias current in coil 28 which is more than enough to desaturate magnetic amplifier 1 each power supply cycle. At quiescent current flow through tube 31 (no signal input) current is adjusted to flow through windings 21 and 28 so that magnetic amplifiers 1 and 2 are brought to desired reset each power supply cycle.

Fig. 4 illustrates reversible dual motor operation in which motors 10 and 32 connected in tandem or on opposite ends of a common load receive the output of amplifiers 1 and 2. Capacitors 13 and 35 are used to provide upper phase shift for the quadrature windings 12 and 34.

This coupling circuit provides a relatively simple and efficient connection by which two magnetic amplifiers can be used to control a device requiring amplitude-modulated, phase-reversible power.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In combination, two magnetic amplifiers, a transformer comprising a first, second and third winding, a first load and a second load, said second winding and said first load connected in parallel with said third winding and said second load, the output of said first magnetic amplifier connected to the common connection of said second winding and said third winding and the common connection of said first load and said second load, and the output of said second magnetic amplifier connected to said first winding.

2. The combination recited in claim 1 wherein said first load is a control winding for an A.-C. motor and said second load is a matching impedance.

3. In combination, a first and second magnetic amplifier, a first load and a second load, a first inductive winding and a second inductive winding, said windings and said loads connected in series, the output of said first magnetic amplifier inductively coupled to said first and said second windings in series, and the output of said second magnetic amplifier connected to flow through said first and said second windings in parallel.

4. The combination recited in claim 3 wherein said first and second loads comprise respective quadrature windings of a two-phase A.-C. motor.

5. The combination recited in claim 3 wherein said magnetic amplifiers provide an A.-C. output.

6. In combination, two full-wave, A.-C., magnetic amplifiers connected to be operated from a common source of power; a first and second load impedance, a first and second inductive winding, said windings connected in series with said load impedances; a third winding magnetically coupled to said first and second windings in series, the output of said first magnetic amplifier connected to flow through said first winding and said first load in parallel with said second winding and said second load and the output of said second magnetic amplifier connected to flow through said third winding.

7. The combination recited in claim 6 wherein said first and second loads comprise, respectively, phase quadrature windings of an A.-C. two-phase motor and each load further comprises a matching impedance.

8. The combination recited in claim 6 wherein is included two motors, said first load comprising a phase quadrature winding from each of said motors, and said second load comprising the remaining windings of each of said motors.

9. The combination recited in claim 6 wherein is included two motors connected to drive a common load, said first load comprising a phase quadrature winding from each of said motors, and said second load comprising the remaining windings of said motors, said former windings connected in parallel with each other and said latter windings connected in parallel with each other.

No references cited.